United States Patent [19]
Tsukamoto et al.

[11] 3,781,088
[45] Dec. 25, 1973

[54] METHOD FOR CHANGING THE TRANSPARENCY OF A LIQUID CRYSTAL CELL

[75] Inventors: Masahide Tsukamoto, Katano-shi; Tetsuro Ohtsuka, Takatsuki-shi, Osaka, both of Japan

[73] Assignee: Matsushita Electric Industrial Co., Ltd., Kadoma, Osaka, Japan

[22] Filed: July 27, 1972

[21] Appl. No.: 275,744

[30] Foreign Application Priority Data
July 29, 1971 Japan.............................. 46-57365

[52] U.S. Cl. .......................... 350/160 LC, 252/408
[51] Int. Cl. .............................................. G02f 1/16
[58] Field of Search ............... 350/160 LC; 252/408

[56] References Cited
UNITED STATES PATENTS
3,503,673  3/1970  Heilmeier et al. ............. 350/160 LC
3,650,603  3/1972  Heilmeier et al. ............. 350/160 LC
3,652,148  3/1972  Wysocki et al. .................... 350/150

OTHER PUBLICATIONS
Wysocki et al.: "Kinetic Study of the Electric Field-Induced Cholesteric-Nematic Transition in Liquid Crystal Films: 1. Relaxation to the Cholesteric State", Liquid Crystals and Ordered Fluids, Plenum Press, New York, 1970 pp. 419–445, QD 921 S9 1969

Primary Examiner—Edward S. Bauer
Attorney—E. F. Wenderoth et al.

[57]  ABSTRACT

A liquid crystal cell including a liquid crystal mixture comprising a nematic liquid crystal having a positive dielectric anisotropy and a stersidal compound which becomes light-transparent from an opaque state when the liquid crystal cell is subjected to an exciting electric field beyond a threshold value of the liquid crystal mixture. The decay time of the liquid crystal mixture required for the liquid crystal mixture to return from the light-transparent state to the opaque state after removal of the exciting voltage beyond the threshold value is increased by applying an a.c. bias voltage below the threshold value.

12 Claims, 7 Drawing Figures

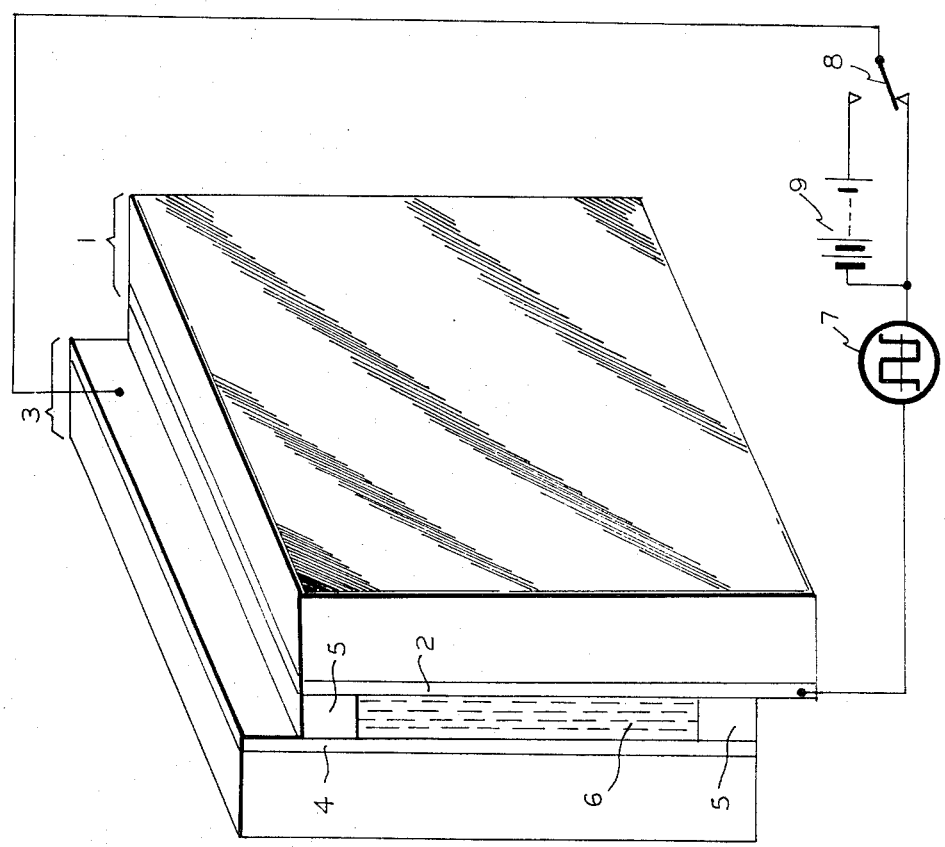
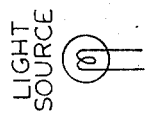
FIG.1

METHOD FOR CHANGING THE TRANSPARENCY OF A LIQUID CRYSTAL CELL

BACKGROUND OF THE INVENTION

This invention relates to a method for changing the transparency of a liquid crystal cell.

A thin film of a nematic liquid crystal having a negative dielectric anisotropy is light-transparent in an unexcited state, but scatters light incident upon it and becomes opaque when excited by a d.c. or low-frequency a.c. field. The light-scattering condition is called the dynamic scattering mode. On the other hand, a liquid crystal mixture consisting essentially of a nematic liquid crystal having a positive dielectric anisotropy and a steroidal compound is normally opaque but becomes light-transparent when excited by a d.c. or a.c. electric field beyond a threshold value of the liquid crystal mixture. These phenomena are called cholesteric-to-nematic phase transition induced by an electric field. The electro-optical properties of the nematic liquid crystal having a negative dielectric anisotropy or the liquid crystal mixture may be employed in reflective and transmissive-type flat panel display devices. However, there are two problems involved, that of a slow turn-on of both the nematic liquid crystal having a negative dielectric anisotropy and the response of a liquid crystal mixture to a sudden application of an electric field and that of lack of maintenance of the excited state after the electric field has been i.e. lack of storage of the excitation signal. These problems prevent the liquid crystal from being employed in electro-optical display devices driven by a time-shearing method or scanning method which can decrease the number of the electronic parts required for the driving circuits. When fast-writing speed is not required, the problem of the slow turn-on can be tolerated, if slow scanning is used. However, the problem of lack of storage makes it difficult to obtain flicker-free display unless an external storage element is added to each display element on the liquid crystal panel.

There are two kinds of liquid crystals which are capable of signal storage. One of them is a liquid crystal mixture consisting essentially of nematic liquid crystals having a negative dielectric anisotropy and cholesteric liquid crystals. This mixture causes dynamic scattering when it is subjected to an electric field, has a longer response time than that of pure nematic liquid crystals having a negative dielectric anisotropy and stores the exciting signal after the electric field has been removed. The storage condition can be erased by a high a.c. electric field at a frequency within the audio frequency range. The other is a mixture of cholesteric liquid crystals which have a cholesteric-to-nematic phase transition induced by a high electric field beyond a threshold value. The phase transition can be observed between crossed polarizers (bright appearance in the cholesteric phase) and dark appearance in the nematic phase. However, the contrast is very low when the crossed polarizers are not used. The dark state in the nematic phase can be maintained for a long time by applying a d.c. electric field below the threshold value. However, these kinds of liquid crystals suffer from more undesirable problems than the previously described crystals which lack a storage function. The mixtures of nematic liquid crystals having a negative dielectric anisotropy and cholesteric liquid crystals suffer from problems in that the turn-on thereof is very slow and they require a high electric field at in audio frequency. The mixtures consisting of cholesteric liquid crystals suffer from problems in that the turn-on thereof is very slow and they require a very high electric field which does not make it possible to use conventional transistors, and they also require troublesome crossed polarizers.

The object of the present invention is to provide a practically useful method for changing the transparency of a liquid crystal cell which can increase the decay time of the liquid crystal (i.e. maintain the light-transparent state for a longer time) so as to eliminate flickers.

The decay time of a liquid crystal mixture is defined as a time period required for the liquid crystal to return from the light-transparent state to the initial opaque state (i.e. light-scattering state) from the time when the exciting electric field is removed.

SUMMARY OF THE INVENTION

This invention provides a method for changing the transparency of a liquid crystal cell, comprising, in combination the steps of Providing a cell including a liquid crystal mixture of the type which is normally opaque comprising 1) a nematic liquid crystal having a positive dielectric anisotropy and 2) a steroidal compound, said cell having two electrodes attached to the respective opposite surfaces thereof; exciting said cell by applying a voltage higher than a threshold value above which said cell is transferred into a light-transparent state; and applying, across said cell, an a.c. bias voltage lower than said threshold value in order to maintain said light-transparent state for a longer time.

BRIEF DESCRIPTION OF THE DRAWINGS

FIG. 1 is a schematic drawing of the essential structure of a liquid crystal cell and the arrangement for applying according to voltages the method of the present invention;

DETAILED DESCRIPTION

Figure 2:
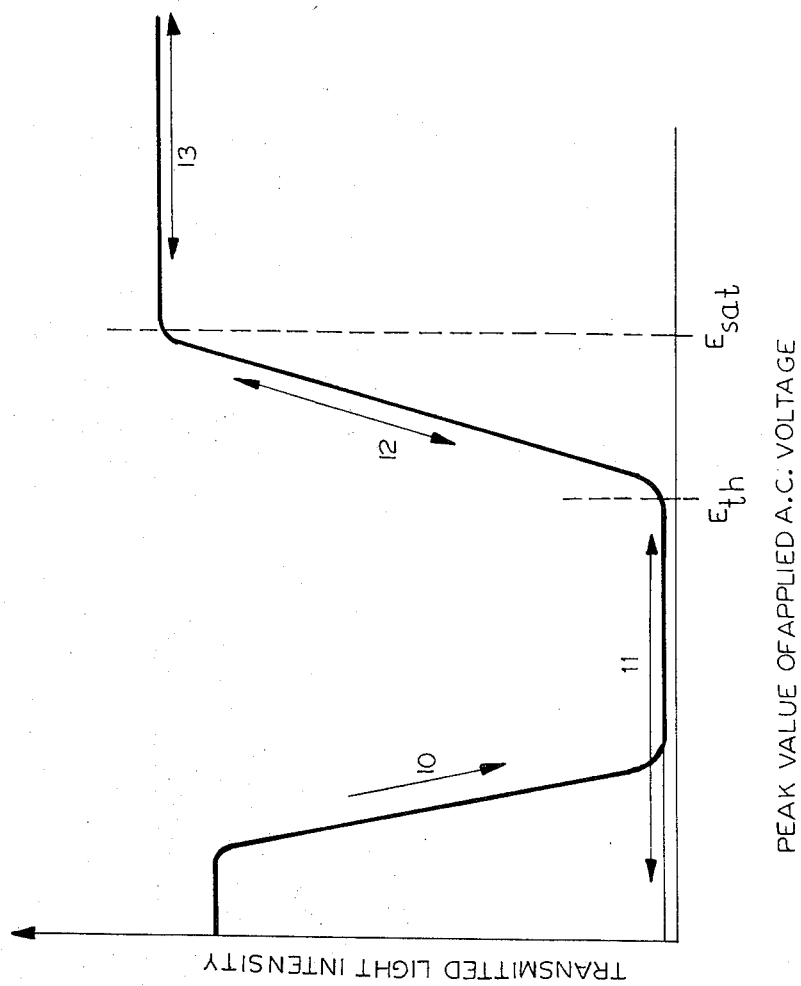
FIG. 2 is a graph showing the characteristic of the intensity of transmitted light vs. peak value of the applied a.c. voltage for the liquid crystal cell as used in the present invention.

The essential structure of a liquid crystal cell and the arrangement for applying voltages as used for the method of the present invention is shown in FIG 1.

To illustrate the present invention simply, only one liquid crystal cell, and a driving circuit connected to the cell is schematically shown in FIG. 1. In a practical display panel, many cells, each of which has the structure as shown in FIG. 1, would be arranged in such manner that they cooperate with each other and make characters or an image. Referring to FIG. 1, the cell consists of a first plate 1 including a first electrode 2, second plate 3 including a second electrode 4, two spacers 5 for separating the plates to form a space between the first and the second electrodes 2 and 4 and a liquid crystal mixture 6 used in the present invention, filling the space. Both the first plate and the second plate are light-transparent. Details concerning the liquid crystal mixture will be described later. The first electrode 2 and the second electrode 4 are opposed to each other so that they contact the liquid crystal mixture directly. An a.c. bias voltage of rectangular waveform generated by a.c. voltage generator 7 is applied to the liquid crystal mixture 6. The voltage of the a.c. bias voltage is lower than the threshold value which will be described in detail with reference to FIG. 2. A d.c. voltage generated by a d.c. voltage source 9 is added to the a.c. bias voltage when a switch 8 is connected to the d.c. voltage source 9. The exciting voltage which is the sum of the a.c. bias voltage and the d.c. exciting voltage must be large enough to bring the liquid crystal cell to an excited light-transparent state which will be described with reference to FIG. 2. An observer can see the cell modulating an incident light from a light source when he operates the switch 8.

FIG. 2 shows the relationship between the intensity of light transmitted through the cell shown in FIG. 1 and the peak value of the applied a.c. voltage. Details of the ingredients of the liquid crystal mixtures in the cell which have the electro-optical properties illustrated with reference to FIG. 2 will be described later. Referring to FIG. 2, the curve in FIG. 2 is obtained by measuring the intensity of light transmitted through the cell shown in FIG. 1 when it has applied thereto an a.c. voltage of rectangular waveform. During the measurement, the switch 8 is connected to the a.c. voltage generator 7. The a.c. voltage is varied within a range from 0 to a voltage beyond the threshold value of the liquid crystal mixture 6. The liquid crystal cell is relatively transparent before application of an a.c. voltage. As the applied a.c. voltage is increased, the incident light from the light source is scattered and so the transmitted light decreases along a curve designated by numeral 10 and reaches a minimum intensity of transmitted light, or an unexcited light-scattering state 11 (i.e. an opaque state). Further increasing the a.c. voltage produces hardly any change until the voltage reaches a threshold value $E_{th}$. Then the intensity of transmitted light begins to increase along a curve designated by numeral 12 after the peak value of the a.c. voltage exceeds the threshold value $E_{th}$, and, after that, continues to increase up to a saturation level 13 which occurs at a saturation voltage $E_{sat}$. The saturation state is called the "excited light-transparent state." When the a.c. voltage decreases from a point above the saturation voltage $E_{sat}$, the intensity of transmitted light decreases again along the curves 12 and 11 and the light-scattering state as designated by the numeral 11 remains for several weeks even if the a.c. voltage is removed. If the a.c. voltage is increased again, the intensity of transmitted light follows the curves 11, 12 and 13.

A curve similar to the curve shown in FIG. 2 can be obtained by using d.c. voltage.

Figure 3:
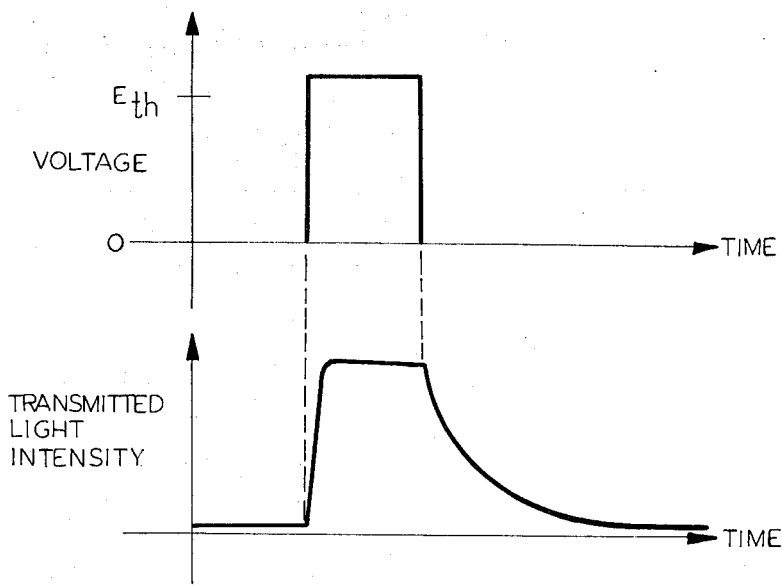
FIG. 3 is a graph showing the characteristic of the intensity of transmitted light vs. time upon application of an exciting voltage for the liquid crystal cell as used in the present invention.
Figure 4:
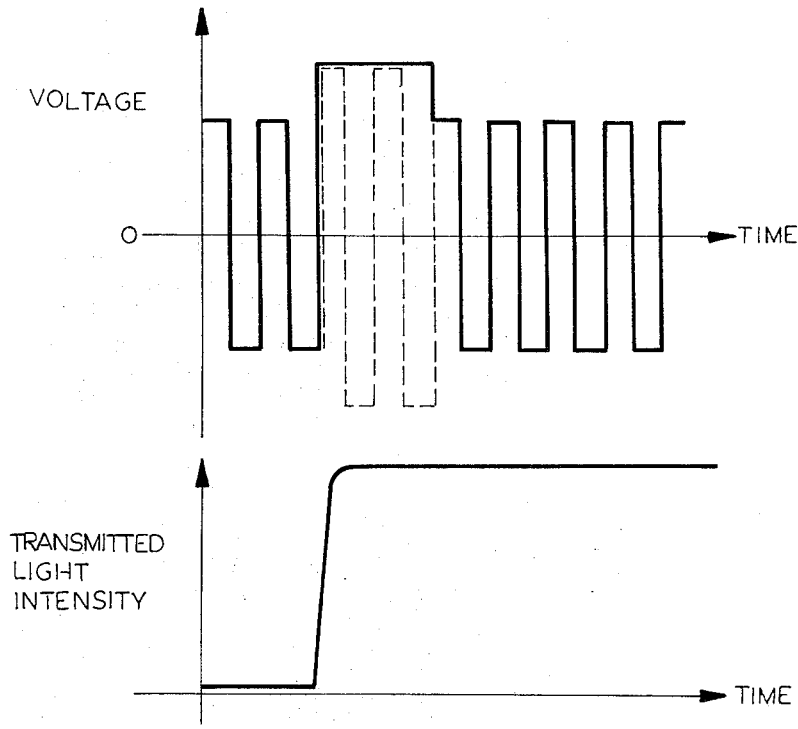
FIG. 4 is a graph showing the characteristic of the intensity of transmitted light vs. time upon application of an exciting voltage during application of an a.c. bias voltage for the liquid crystal cell as used in the present invention.

The threshold value is determined essentially by the amounts of ingredients of the liquid crystal mixture, the kinds of ingredients, and the frequency and waveform of the applied a.c. voltage. Therefore, in the following description, "the threshold value $E_{th}$" means the peak value of the a.c. voltage, above which a liquid crystal cell begins to be brought to the excited light-transparent state. FIG. 3 shows the characteristic of the intensity of transmitted light vs. time for the liquid crystal cell upon application of an exciting voltage without any bias, while FIG. 4 shows the characteristic of the intensity of transmitted light vs. time for the liquid crystal cell upon application of an exciting voltage while the cell has applied thereto an a.c. bias voltage. Referring to FIG. 3, the voltage applied to the liquid crystal cell is high enough to bring the liquid crystal cell to the excited light-transparent state as illustrated in FIG. 2. The intensity of transmitted light reaches saturation or a maximum after a delay, and decays very fast after the exciting voltage has been removed. On the other hand, when an a.c. bias voltage of rectangular waveform and having a peak value below the threshold value is applied to the cell, after the further application of the d.c. exciting voltage $E_{th}$, the decay time becomes very long as shown in FIG. 4. The decay time depends upon the voltage and the frequency of the a.c. bias voltage. The decay time rapidly increases when the peak value of the a.c. bias voltage comes close to the threshold value $E_{th}$. An a.c. bias voltage at a frequency within a range from 10 Hz to 10KHz is effective to increase the decay time. A d.c. bias voltage increases the decay time, but the decay time obtained by the d.c. bias voltage is shorter by more than 2 orders of magnitude than the decay time obtained by an a.c. bias voltage at a frequency within a range from 10Hz to 10KHz. More than a few minutes of decay time can be obtained with respect to most liquid crystal mixtures by using an a.c. bias voltage at a frequency within that range. An a.c. voltage which is represented by a broken line in FIG. 4 may be used as an exciting voltage instead of a d.c. exciting voltage. As a matter of course, the peak value of such an a.c. voltage should exceed the threshold value $E_{th}$. Any exciting voltage may be used if the peak value of the exciting voltage exceeds the threshold value $E_{th}$, such as a voltage generated by superposing a d.c. voltage on the a.c. bias voltage or a voltage generated by superposing an a.c. voltage field on the a.c. bias voltage.

Although in the foregoing description an a.c. voltage and an exciting voltage both having a rectangular waveform are used, any waveform may be used such as a sinusoidal waveform and triangular waveform. There are many methods for applying an a.c. bias voltage to the liquid crystal cell. Details of the methods will be described later.

The liquid crystal mixture in the cell, which has the electro-optical properties as described above with reference to FIG. 2 and is used in this invention, consists essentially of a nematic liquid crystal having a positive dielectric anisotropy and a steroidal compound as described below.

A nematic liquid crystal having a positive dielectric anisotropy is a organic comound having its molecular dipole moment parallel to its long molecular axis. Typical compounds which represent the nematic liquid crystals having a positive dielectric anisotropy are p-alkoxybenzylidene-p'-cyanoanilines, p-cyanobenzylidene-p'-alkoxyanilines, p-alkoxybenzylidene-p'-aminoazobenzenes, and n-alkyl-p-cyanobenzylidene-p'-aminocinnamates. Among these, p-alkoxybenzylidene-p'-cyanoanilines are most desirable because they have a large positive dielectric anisotropy. Examples of p-alkoxybenzylidene-p'-cyanoanilines having a relatively low crystal-nematic transition temeperatures are p-n-butoxybenzylidene-p'-cyanoaniline (transition temperature: 63°C), p-n-pentoxy-benzylidene-p'-cyanoaniline (62°C), p-n-hexoxybenzylidene-p'-cyanoaniline (55°C), p-n-heptoxybenzylidene-p'-cyanoaniline (67°C) and p-n-octoxybenzylidene-p'-cyanoaniline (79°C).

Steroidal compounds, which are necessary in order to obtain the electro-optical properties described with reference to FIG. 2, are β-cholestanol, ergosterol, lanosterol, cholesterol and cholesterin derivatives. Above all, cholesterin derivatives are most desirable, because a cell containing a liquid crystal mixture consisting of a nematic liquid crystal having a positive dielectric anisotropy and cholesterin derivatives has a high contrast (i.e., a high ratio of the maximim intensity of transmitted light under excitation by an exciting voltage above the saturation voltage $E_{sat}$ to the minimum intensity of transmitted light under excitation by an a.c. voltage below the threshold value $E_{th}$).

Decreasing of the concentration of the steroidal compound results in decreasing the contrast. For obtaining an operable contrast, at least more than 1 mole percent of a steroidal compound is required, because less than 1 mole percent of the steroidal compound results in an undesirably low contrast. Increasing of the concentration of the steroidal compound results in increasing the threshold value $E_{th}$. More than 15 mole percent of the steriodal compound results in an undesirably high threshold value.

For example, a liquid crystal mixture consisting of 99 mole percent of p-n-butoxybenzylidene-p-cyanoaniline and 1 mole percent of cholesteryl oleyl carbonate has a contrast of 3:1 which is substantially the lowest contrast suitable for display. A liquid crystal mixture consisting of 85 mole percent p-n-butoxybenzylidene-p-cyanoaniline and 15 mole percent of cholesteryl oleyl carbonate has a threshold of about 100V when the thickness of the liquid crystal layer (i.e. the distance between electrodes) is 25μ. A liquid crystal mixture having a threshold higher than such a high threshold is very difficult to use because of the breakdown of the liquid crystal layer, a requirement for expensive transistors, etc.

A liquid crystal mixture consisting of a nematic liquid crystal having a positive dielectric anisotropy and a steroidal compound as described above (two-component liquid crystal mixture) has operable electro-optical properties. A liquid crystal mixture consisting of a plurality of nematic liquid crystals having a positive dielectric anisotropy and a plurality of steroidal compounds is also a two component liquid crystal mixture and is also operable. However, such a two component liquid crystal mixture has disadvantages in that it is likely to be solidified a at a room temperature or below.

For example, a liquid crystal mixture consisting of 50 mole percent of p-n-butoxybenzylidene-p'-cyanoaniline, 44 mole percent of p-ethoxybenzylidene-p'-n-cyanoaniline and 6 mole percent of cholesteryl oleyl carbonate has a crystal-liquid crystal transition temperature of about 40°C.

Some kinds of pure cholesteric liquid crystals and some kinds of cholesteric mixtures consisting of only pure cholesteric liquid crystals also have similar electro-optical properties to those of the two-component liquid crystal mixture as described above. However such a pure cholesteric liquid crystal or cholesteric mixture is less desirable than the above mentioned two-component liquid crystal mixture because it has an undesirably high threshold value usually more than 10 times as large as the threshold value of the two-component liquid crystal mixture and further has a low contrast. Further, crossed polarizers which may be used in order to obtain a high contrast are very troublesome.

For overcoming the disadvantages of the two-component liquid crystal mixture, it has been found that an addition of a nematic liquid crystal having a negative dielectric anisotropy is very effective.

A nematic liquid crystal having a negative dielectric anisotropy is an organic compound having its molecular dipole moment perpendicular to its long molecular axis as well known. Typical compounds which are representative of the nematic liquid crystals having a negative dielectric anisotropy are anisalazine, p, p'-dialkoxyazoxybenzenes, p-alkoxybenzylidene-p'-acyloxyanilines and p-alkoxybenzylidene-p'-alkylanilines. Above all, p-alkoxybenzylidene-p'-alkylanilines are most desirable because they have a relatively small negative dielectric anisotropy. Examples of p-alkoxybenzylidene-p'-alkylanilines having low crystal-liquid crystal transition temperatures are p-methoxybenzylidene-p'-n-propylaniline (transition temperature: 42°C), p-methoxybenzylidene-p'-n-butylaniline (20°C) and p-ethoxybenzylidene-p'-n-butylaniline (36°C). These nematic liquid crystals have a desirable effect on lowering the crystal-liquid crystal transition temperature of a liquid crystal mixture and shortening the rise time required for a liquid crystal mixture to reach the excited light-transparent state from the unexcited light-scattering state upon a sudden application of an exciting voltage.

In order to obtain practically useful electro-optical properties in the case of this three-component liquid crystal mixture, more than 3 mole percent of a nematic liquid crystal having a positive dielectric anisotropy and more than 1 mole percent of a steroidal compound are required, the remainder being a nematic liquid crystal having a negative dielectric anisotropy. A decrease of the concentration of the nematic liquid crystal mixture having a positive dielectric anisotropy results in an increase of the threshold value. A decrease of the concentration of the steroidal compound results in a decrease in the contrast. A liquid crystal mixture including a nematic liquid crystal having a negative dielectric anisotropy has a minimum crystal-liquid crystal transition temperature at a certain concentration of the nematic liquid crystal having a negative dielectric anisotropy. This certain concentration is called the eutectic point. Less than 3 mole percent of a nematic liquid crystal having a positive dielectric anisotropy results in an undesirably high threshold value. For example, a liquid crystal mixture consisting of 3 mole percent of p-n-butoxybenzylidene-p'-cyanoaniline, 87 mole percent of p-methoxybenzylidene-p'-n-butylaniline and 10 mole percent of cholesteryl oleyl carbonate has a threshold value of 100V when the thickness of the liquid crystal mixture layer is 25μA liquid crystal mixture having a threshold higher than such a high threshold is very difficult to use for the same reasons as set forth above. Less than 1 mole percent of a steroidal compound results in an undesirably low contrast as set forth above. For example, a liquid crystal mixture consisting of 29 mole percent of p-ethoxy-benzylidene-p'-n-cyanoaniline, 70 mole percent of p-methoxybenzylidene-p'-n-butylaniline and 1 mole percent of cholesteryl oleyl carbonate has a contrast of 3:1 and threshold value of 10V when the thickness of the liquid crystal mixture layer is 25μ. The contrast of 3:1 is substantially as low as the contrast for display. Less than a certain amount of a nematic liquid crystal having a negative dielectric anisotropy results in an undesirable solidification of the liquid crystal mixture when kept at room temperature or below. This certain amount changes with the kind of materials used for the liquid crystal mixture. For example, a liquid crystal mixture consisting of 35 mole percent of p-ethoxybenzylidene-p'-n-cyanoaniline, 40 mole percent of p-n-butoxybenzylidene-p'-cyanoaniline, 5 mole percent of cholesteryl carbonate and 20 mole percent of p-methoxybenzylidene-p'-n-butylaniline has a crystal-liquid crystal transition temperature of about 25°C. A decrease in the amount of p-methoxybenzylidene-p'-n-butylaniline causes an increase of the transition temperature.

Not only can there be used a three-component liquid crystal mixture consisting essentially of only one nematic liquid crystal mixture having a positive dielectric anisotropy, only one nematic liquid crystal having a negative dielectric anisotropy and only one steroidal compound, but also a three-component liquid crystal mixture consisting essentially of a plurality of nematic liquid crystals having a positive dielectric anisotropy, a plurality of nematic liquid crystals having a negative dielectric anisotropy and a plurality of steroidal compounds can be used, of course.

Table 1 shows half-decay times obtained by employing the method of the present invention with an exemplary liquid crystal mixture. The exemplary liquid crystal mixture consists of two nematic liquid crystals having a positive dielectric anisotropy (30 mole percent of p-n-butoxybenzylidene-p'-cyanoaniline and 18 mole percent of p-n-octoxybenzylidene-p'-cyanoaniline) one nematic liquid crystal having a negative dielectric anisotropy (47 mole percent of p-methoxybenzylidene-p'-n-butylaniline) and one cholesterin derivative (5 mole percent of cholesteryl oleyl carbonate). This liquid crystal mixture can be operated at a tempterature of 2 to 75°C.

For measuring half-decay times of the liquid crystal mixture, a cell as shown in FIG. 1 and containing the above-mentioned liquid crystal mixture was used. The distance betwen the two electrodes was provided by mylar spacers with a thickness of 25μ. The results in Table 1 (half-decay times) were obtained by measuring a time required for the intensity of light transmitted through the cell to decrease to a half the maximum value of the intensity of transmitted light in the excited light-transparent state of the liquid crystal mixture after removal of an exciting electric field.

A d.c. electric field was superposed an a continuous a.c. bias voltage so that the liquid crystal mixture could be brought to the excited light-transparent state. An a.c. voltage of rectangular waveform was used for applying the a.c. bias voltage to the liquid crystal mixture in the cell.

Referring to Table 1, the first column gives the peak value of the a.c. bias voltage in units of V. The second, the third and the fourth column give obtained half-decay times in a units of sec. at frequencies of 500Hz, 100Hz and 20Hz respectively. Although not shown in Table 1, the operable range for the frequency of the applied a.c. bias voltage is 10Hz to 10KHz. Below 10Hz, the half decay time becomes too short (as in the case of d.c. bias as explained later) to be adapted to the present invention The half decay time at a frequency above 500Hz up to 10 KHz is almost constant. Above 10KHz, the half decay time rapidly decreases.

The lower limit (e.g. 10Hz) and the upper limit (10Kz) of frequency of the a.c. bias depend on the kinds of materials used for the liquid crystal mixture, and ambient temperature. The upper limit of the frequency is considered to be determined by the maximum frequency above which the dipole moment of the molecules of the liquid crystal cannot rotate following the frequency of the applied a.c. voltage. The lower limit of the frequency is considered to be determined by the frequency below which the ion flow in the liquid crystal mixture disturbs the orientation of the molecules remarkably. The lowest row in the Table gives threshold values in units of V at respective frequencies. The last column gives half-decay times and threshold value in units of sec. under d.c. bias voltage. The last column is provided for making clear the effectiveness of the a.c. bias voltage on the increase of decay time. In the Table 1, "very long" means more than ten minutes. Without any bias, the decay time of this liquid crystal mixture is about 50 m sec. Then, if a fast turn-off is required, a method in which the a.c. bias voltage should be removed suddenly may be used. It is understood with reference to Table 1 that an a.c. bias voltage below the threshold E$th$ increases the decay time effectively.

Figure 5:
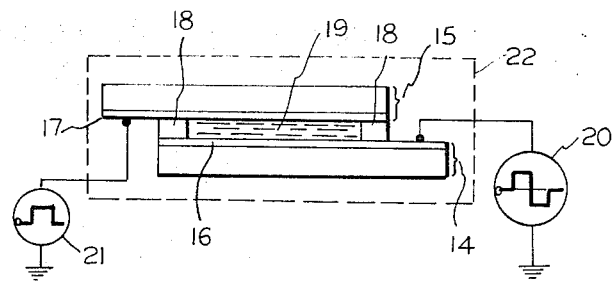
FIG. 5 is a schematic drawing showing a method for applying an a.c. bias voltage and an exciting voltage to the liquid crystal cell as used in the present invention.
Figure 6:
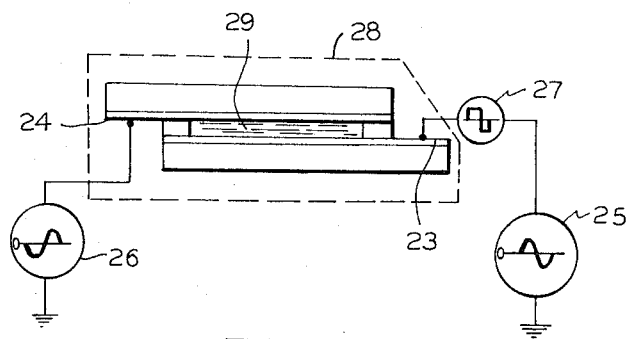
FIG. 6 is a schematic drawing showing a method different from the method shown in FIG. 5 for applying an a.c. bias voltage and an exciting voltage to the liquid crystal cell as used in the present invention.
Figure 7:
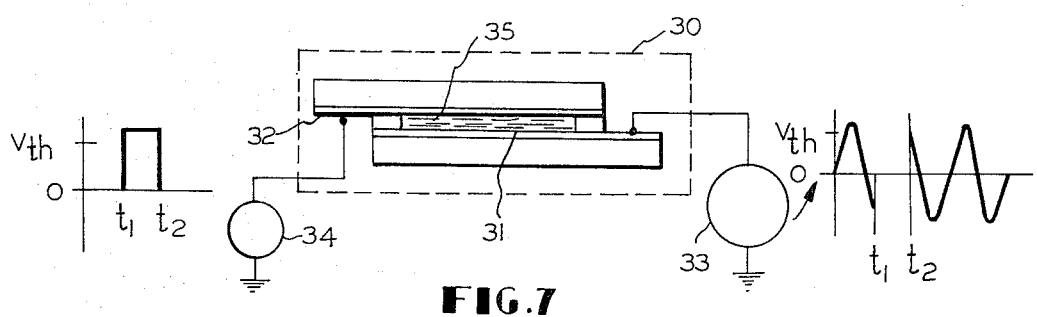
Fig. 7 is a schematic drawing showing a method different from the methods shown in FIG. 5 and FIG. 6 for applying an a.c. bias voltage and an exciting voltage to the liquid crystal cell as used in the present invention.

FIG. 5, FIG. 6 and FIG. 7 show some methods for applying an a.c. bias voltage and an exciting voltage to the liquid crystal mixture. FIG. 5 is a cross section of a cell as shown in FIG. 1, with the cell designated 22, and an a.c. voltage generator 20 is connected to the first electrode 16 for applying an a.c. bias voltage to the liquid crystal mixture and an exciting voltage pulse generator 21 connected to the second electrode 17 for generating an exciting voltage across the liquid crystal mixture cooperating with the a.c. bias voltage. The first plate 14 which is light-transparent and has the first electrode 16 attached thereon and the second plate 15 which is also light-transparent and has the second electrode 17 attached thereon have the space between them filled with the liquid crystal mixture 19 used in the present invention. The distance between the first electrode 16 and the second electrode 17 is determined by the thickness of spacers 18. The a.c. voltage generator 20 generates a continuous a.c. voltage of rectangular waveform the amplitude of which is arranged such that the peak value of the a.c. bias voltage does not exceed the threshold value Eth of the liquid crystal mixture 19. The exciting voltage pulse generator 21 generates an exciting voltage pulse of rectangular waveform.

The height of the exciting voltage pulse generated by the exciting voltage pulse generator 21 is such that the peak value of the exciting voltage, i.e., the sum of the a.c. bias voltage generated by the a.c. voltage generator 20 and the voltage of the d.c. voltage generated by the exciting voltage pulse generator 21, exceeds the threshold value E$th$. In practice, the exciting voltage pulse may be controlled by an external signal for controlling the transparency of the cell. If the excited light-transparent state illustrated with reference to FIG. 2 is required to be held continuously, repeated exciting pulses should be used. The a.c. voltage generator 20 for the a.c. bias and the exciting voltage pulse generator 21 are not required to have low impedance because the cell 22 usually has a higher impedance than that of usual generators of such kind. Although the waveforms of the generators of FIGS. 5 have been described as rectangular waveforms, any waveform may be used such as a sinusoidal waveform and triangular waveform. Further, another exciting pulse generator which generates an a.c. voltage for a short time may be used. In this case, as a matter of course, the peak value of the exciting voltage obtained by the sum of the a.c. bias and the a.c. voltage generated by said another exciting pulse generator should exceed the threshold value E$th$. Although in FIG. 5, the average level of the a.c. voltage generated by the a.c. voltage generator 20 is shown as 0, or the ground level, the average level is not limited to the ground level. If the average level of the a.c. voltage generated by the a.c. voltage generator 20 is a standard level other than ground, the exciting voltage pulse generated by the exciting voltage pulse generator 21 should be biased to a level which is substantially the same as the standard level. Although in FIG. 5, the exciting voltage pulse generator 21 is connected to the second electrode, it may be connected to the first electrode in series with the a.c. voltage generator 20.

FIG. 6 shows another method for applying the a.c. bias voltage and an exciting voltage to the liquid crystal mixture. Referring to FIG. 6, a cell 28 is shown which is the same as the cell shown in FIG. 5. The first a.c. voltage generated by the first a.c. voltage generator 25 is applied to the first electrode 23 through an exciting voltage pulse generator 27. The second a.c. voltage generated by the second a.c. voltage generator 26 is applied to the second electrode 24. The first a.c. voltage has a phase different from that of the second a.c. voltage. In this case, the phase difference between the first a.c. voltage and the second a.c. voltage and the amplitude of the first and second a.c. voltages should be such that the resultant a.c. voltage generated by the voltage difference between the first and second a.c. voltages does not exceed the threshold value E$th$ of the liquid crystal mixture 29. In FIG. 6, a sinusoidal waveform has been shown for the first and the second a.c. voltages. However, any waveform may be used such as rectangular and triangular. The average level of the first a.c. voltage should be substantially the same standard level as that of the second a.c. voltage. In FIG. 6, the standard level is shown as 0, or ground level. However, any standard level may be used. The exciting voltage pulse generator 27 generates an exciting a.c. voltage pulse having a rectangular waveform.

The amplitude of the exciting a.c. voltage pulse generated by the exciting voltage pulse generator 27 is arranged so that the peak value of the exciting voltage, i.e. the sum of the a.c. bias voltage generated by the first and the second a.c. voltage generators 25 and 26 and the a.c. voltage generated by the exciting voltage pulse generator 27, exceeds the threshold value E$th$ of the liquid crystal mixture 29. Although in FIG. 6, a rectangular waveform is used for the exciting a.c. voltage any waveform may be used.

FIG. 7 shows a further method which produces the same effect as those illustrated with reference to FIG. 5 and FIG. 6. Referring to FIG. 7, a cell 31 is the same as the cell shown in FIG. 5 and FIG. 6. An a.c. voltage generator 33 for generating an a.c. bias voltage across the liquid crystal mixture 35 is connected to the first electrode 31. An exciting voltage pulse generator 34 for generating a pulse of d.c. voltage across the liquid crystal mixture 35 is connected to the second electrode 32. As shown in FIG. 7, the a.c. voltage generator 34 generates an a.c. voltage except during a time interval from $t_1$ to $t_2$ during which the exciting voltage pulse generator 34 generates an exciting d.c. voltage pulse. The amplitude of the a.c. bias voltage should not exceed the threshold voltage as shown in Table 1. In this example, as a matter of course, the exciting d.c. voltage generated by the exciting voltage pulse generator 34 should exceed the threshold value E$th$. The exciting voltage pulse generator 34 may be connected to the first electrode 31 in series with the a.c. voltage generator 33. Any waveform of the a.c. voltage for the a.c. bias voltage and the exciting voltage pulse may be used as well as these waveforms illustrated with reference to FIG. 5 and FIG. 6. The above-mentioned methods for applying an a.c bias voltage and an exciting voltage to the liquid crystal mixture are only a few examples. Many other methods may be used in the present invention.

As is apparent from the descriptions hereinbefore, according to the method of the present invention, the decay time of a liquid crystal mixture is increased by applying an a.c. bias voltage below the threshold value of the liquid crystal mixture. Therefore, flicker which is a deficiency in liquid crystal display devices using a time-shearing method can be removed, and temporary-memory display devices having a simple structure can be obtained by using the method of the present invention.

TABLE 1

| Peak Value of a.c. Bias Voltage (V) | Half Decay Time (sec) | | | |
|---|---|---|---|---|
| | 500 Hz | 100 Hz | 20 Hz | d.c. |
| 36 | 7 | 10 | 14 | 0.25 |
| 38 | 9 | 18 | 20 | 0.30 |
| 40 | 18 | 27 | 35 | 0.35 |
| 42 | 3037 | | very long | 0.39 |
| 44 | > 200 | very long | | 0.43 |
| 46 | very long | | | 0.46 |
| Threshold value E$_{th}$(V) | 46 | 44 | 42 | 46 |

What we claim is:

1. A method for changing the transparency of a liquid crystal cell, comprising in combination the steps of:
   providing a cell including a liquid crystal mixture of a type which is normally opaque comprising a nematic liquid crystal having a positive dielectric anisotropy and a steroidal compound, said cell having two electrodes attached to the respective opposite surfaces thereof;
   exciting said cell by applying a voltage higher than a threshold value above which said cell is transferred into a light-transparent state; and applying across said cell an a.c. bias voltage lower than said threshold value in order to maintain said light-transparent state for a longer time.

2. A method for changing the transparency of a liquid crystal cell as claimed in claim 1 wherein said nematic liquid crystal having a positive dielectric anisotropy is a member selected from the group consisting of p-alkoxybenzylidene-p'-cyanoanilines, p-cyanobenzylidene-p'-alkoxyanilines, p-alkozybenzylidene-p'-aminoazobenzenes, and n-alkyl-p-cyanobenzylidene-p'-aminocinnamates.

3. A method for changing the transparency of a liquid crystal cell as claimed in claim 1, wherein said steroidal compound is a member selected from the group consisting of β-cholestanol, ergosterol, lanosterol, cholesterol and cholesterin derivatives 4. A method for changing the transparency of a liquid crystal cell as claimed in claim 1, wherein the amount of said nematic liquid crystal having a positive dielectric anisotropy is from 85 to 99 mole percent and the amount of said steroidal compound is from 1 to 15 mole percent.

5. A method for changing the transparency of a liquid crystal cell as claimed in claim 4, wherein said nematic liquid crystal having a positive dielectric anisotropy is p-n-butoxy-benzylidene-p'-cyanoaniline, and said steroidal compound is cholesteryl oleyl carbonate.

6. A method for changing the transparency of a liquid crystal cell as claimed in claim 1, wherein said liquid crystal mixture further comprises a nematic liquid crystal having a negative dielectric anisotropy.

7. A method for changing the transparency of a liquid crystal cell as claimed in claim 6 wherein said nematic liquid crystal having a negative dielectric anisotropy is a member selected from the group consisting of anisalazines, p, p'-dialkoxyazoxybenzenes, p-alkoxybenzylidene-p'-acyloxyanilines and p-alkoxybenzylidene-p'-alkylanilines.

8. A method for changing the transparency of a liquid crystal cell as claimed in claim 6, wherein the amount of said nematic liquid crystal having a positive dielectric anisotropy is more than 3 mole %, and the amount of said steroidal compound is more than 1 mole %.

9. A method for changing the transparency of a liquid crystal cell as claimed in claim 8, wherein said nematic liquid crystal having a positive dielectric anisotropy consists of p-n-butoxybenzylidene-p'-cyanoaniline and p-n-octoxybenzylidene-p'-butylaniline, said steroidal compound is cholesteryl oleyl carbonate, and said nematic liquid crystal having a negative dielectric anisotropy is p-methoxybenzylidene-p'-n-butylaniline.

10. A method for changing the transparency of a liquid crystal cell as claimed in claim 1, wherein said a.c. bias voltage is generated by applying an a.c. voltage to one of said electrodes, the average level of said a.c. voltage being a standard level, and by holding the other electrode at a level substantially the same as said standard level.

11. A method for changing the transparency of a liquid crystal cell as claimed in claim 10, wherein said standard level is ground level.

12. A method for changing the transparency of a liquid crystal cell as claimed in claim 1, wherein said a.c. bias voltage is generated by applying a first a.c. voltage to one of said electrodes and a second a.c. voltage to the other electrode, said second a.c. voltage having an average level substantially same as that of said first a.c. voltage and having a phase different from that of said first a.c. voltage.

* * * * *